United States Patent Office 2,813,869
Patented Nov. 19, 1957

2,813,869

VAPOR PHASE SYNTHESIS OF CARBON-SUBSTITUTED PYRAZINES AND PIPERAZINES

William K. Langdon, Grosse Ile, Mich., assignor to Wyandotte Chemicals Corporation, Wyandotte, Mich., a corporation of Michigan No Drawing. Application March 29, 1957,
Serial No. 649,311

9 Claims. (Cl. 260—268)

This invention relates to the synthesis of carbon-substituted pyrazines and piperazines. In a more specific aspect, this invention relates to an improved method of synthesizing carbon-substituted pyrazines and piperazines which is conducted in vapor phase over a copper hydrogenation/dehydrogenation catalyst.

This application is a continuation-in-part of my copending application Serial No. 432,686, filed May 27, 1954, now abandoned.

Carbon-substituted pyrazines and piperazines, such as 2,5-dimethylpyrazine, 2,5-dimethylpiperazine, 2,5-diethylpyrazine and 2,5-diethylpiperazine, are known compounds whose chemical and physical properties make them of interest as intermediates in the preparation of rubber accelerators, condensation polymers, pharmaceuticals and dyestuffs. In spite of their many interesting chemical and physical properties, such compounds have heretofore been little more than laboratory curiosities because they have been obtainable only through difficult and costly synthesis. Typical of the syntheses used to obtain 2,5-dimethylpiperazine are the following:

(A) Reduction of 3,6-dimethyl-2,5-diketopiperazine with sodium (Hoyer, Z. physiol. Chem., 34, 350 (1902)).
(B) Reduction of 2,5-dimethylpyrazine with sodium (Stoehr, J. prakt. Chem. (2) 47, 494, 508 (1893)).
(C) Catalytic hydrogenation of lactamide over copper chromite (Oeda, J. Chem. Soc. Japan, 13, 465–70 (1938); Chemical Abstracts, 32, 8427 (1938)).

All of the above methods suffer the shortcoming of requiring costly raw materials or giving poor yields or both. Bain and Pollard have disclosed in the Journal of the American Chemical Society, vol. 61, page 532 (1939), that isopropanolamine was heated in liquid phase in a dioxane solution over a copper chromite catalyst at 250–275° C. and an 18% yield of 2,5-dimethylpiperazine was obtained. Although the Journal article cited above does not give the complete reaction conditions employed by Bain and Pollard, page 43, of the original thesis from which the digest was made makes it clear that the reaction by Bain and Pollard was carried out in dioxane solvent in liquid phase in a bomb reactor. A yield of 18% is obviously inadequate as a basis for a profitable commercial application of the method.

It is an object of this invention, therefore, to provide an improved method for preparing carbon-substituted pyrazines and piperazines.

It is a further object of this invention to provide an efficient and economical synthesis for carbon-substituted pyrazines in high yield.

I have found that carbon-substituted pyrazines and piperazines can be prepared in high yields by heating an alkanolamine, subsequently defined, in the presence of a copper hydrogenation/dehydrogenation catalyst in the vapor phase at a temperature in the range from 175–400°

C. The alkanolamines employed in the process of this invention correspond to the formula

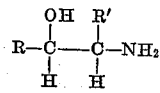

wherein R is a methyl or ethyl radical and R' is hydrogen or a methyl radical, the total number of carbon atoms in R and R' collectively being not greater than 2. Thus, the alkanolamines employed in the process are monoisopropanolamine, 1-amino-2-hydroxybutane and 2-amino-3-hydroxybutane. When monoisopropanolamine is employed in the process of the invention, the product is predominantly 2,5-dimethylpyrazine together with a minor quantity of 2,5-dimethylpiperazine. When 1-amino-2-hydroxybutane is employed in the process, the product is mainly 2,5-diethylpyrazine together with a minor amount of 2,5-diethylpiperazine. When the alkanolamine employed in the process is 2-amino-3-hydroxybutane, the product obtained is 2,3,5,6-tetramethylpyrazine together with a small quantity of 2,3,5,6-tetramethylpiperazine.

The most significant factor in the process of this invention is that conversions of over 50% to the carbon-substituted pyrazines and piperazines are obtained predominating largely in the carbon-substituted pyrazine product. While the reaction mechanism has not been definitely and unequivocally established, it is believed that the process does not proceed through a simple intermolecular dehydration between an amino hydrogen atom and the hydroxy group of the alkanolamine. There is evidence that two or more competing reaction mechanisms are involved, each of which proceeds through a series of intermediate reactions. The process is believed to proceed through a series of steps involving dehydrogenation, hydrogenation and both intermolecular and intramolecular Schiff base formations, i. e., a dehydration between a primary amine and a ketone.

Any of the well-known copper hydrogenation/dehydrogenation catalysts can be used in the process of this invention. Particularly outstanding results have been obtained with copper chromite and this catalyst constitutes a preferred catalyst in the process of the invention. However, other copper hydrogenation/dehydrogenation catalysts have been used successfully in the process of the invention, such as copper metal turnings, barium-stabilized copper chromite on silicate support, and metallic copper on an alumina support.

The process of this invention can be carried out over a wide range of temperatures, the precise range being determined by such variables as the particular copper catalyst employed, its activity, the contact time between the alkanolamine and the catalyst, and the yield and conversion desired. In particular, the type of copper catalyst and its activity has a very important influence on the temperature employed in the process. For example, with fresh Harshaw copper chromite catalyst 0203 (Harshaw Chemical Company, Cleveland, Ohio) it is possible to obtain a 40% conversion of monoisopropanolamine to 2,5-dimethylpyrazine and 2,5-dimethylpiperazine at 175° C. when the monoisopropanolamine is passed over the catalyst bed at the rate of one gram of monoisopropanolamine per hour per gram of catalyst. Within a relatively short time, however, the color of the copper chromite catalyst changes from black to red indicating that the copper is being reduced, and thereafter it is necessary to increase the temperature to above 200° C. to obtain high conversions. Since copper catalysts do not catalyze the thermal decomposition of the carbon-substituted pyrazines and pyrazines produced by the process of this invention, it is possible to operate at temperatures as high as 400° C. or even higher without substantially adversely affecting the total yield and conversion. The temperature employed generally falls in the range from 175° C. to about 400° C. Generally optimum conversions and yields are obtained at a temperature in the range from about 225° C. to about 350° C., with the very best results usually being obtained within the temperature range of about 250° C. to about 325° C.

The effect of the contact time between the alkanolamine and the catalyst on the temperature range is that which would be expected. With short contact times, higher temperatures can be employed than when longer contact times are used. Similarly, at lower temperatures it is possible to obtain better yields and conversions with long contact times than when shorter contact times are used. Other process variables such as the use of inert diluents also have at least a minor effect upon the temperature than can be employed.

The reaction can be carried out at either atmospheric or subatmospheric pressures. This invention is concerned solely with a vapor phase reaction and for this reason it is not feasible to operate at pressures substantially above atmospheric, since such pressures cause liquefaction of the alkanolamine reactant.

It has been noted that the process of this invention produces carbon-substituted pyrazines and piperazines. The ratio of such pyrazines to such piperazines that is obtained is importantly influenced by the reaction conditions employed. The formation of carbon-substituted pyrazines is favored by high temperatures and long contact times whereas carbon-substituted piperazines are favored by low temperatures and short contact times. A fundamental feature of the process of this invention resides in the production of proportionately large amounts of carbon-substituted pyrazines.

Theoretical considerations would indicate that the addition of hydrogen to the alkanolamine feed would favor the formation of the corresponding carbon-substituted piperazines and this result has been observed experimentally. However, the addition of hydrogen to the reaction also lowers the total conversion of the desired carbon substituted pyrazines and piperazines, and as a result, where carbon-substituted piperazines are desired, it is better practice to carry out the process in the absence of added hydrogen and subsequently hydrogenate the carbon-substituted pyrazine in a separate step. Where carbon substituted pyrazines are desired as the sole product, the co-formed carbon-substituted piperazines can be recycled to the reaction zone and dehydrogenated in the process of the reaction.

The total reaction product obtained in the process of the invention is a mixture consisting predominantly of water, carbon-substituted pyrazines and carbon-substituted piperazines and unreacted alkanolamine. The carbon-substituted pyrazines can be easily removed from the reaction mixture by simply adding water thereto, if needed, and distilling therefrom an azeotrope of carbon-substituted pyrazine and water. The carbon-substituted piperazine can be separated from the reaction mixture by fractional distillation. In the case where monoisopropanolamine is employed in the process of the invention, the unreacted monoisopropanolamine can be separated from the 2,5-dimethylpiperazine product by azeotropic distillation with xylene, ethylbenzene or isopropylbenzene as disclosed and claimed in the copending application of John T. Patton, Jr., Serial No. 562,941, filed February 2, 1956.

The following examples are set forth to illustrate the principle and practice of the process of this invention and should not be employed to unduly restrict the scope of the process as it has been disclosed hereinabove. The terms "conversion" and "yield" are employed in this specification and are defined as follows:

$$\text{Percent conversion} = \frac{(2) \times (\text{mols product obtained}) \times (100)}{(\text{mols alkanolamine charged})}$$

$$\text{Percent yield} = \frac{(2) \times (\text{mols product obtained}) \times (100)}{(\text{mols alkanolamine charged}) - (\text{mols alkanolamine recovered})}$$

EXAMPLE 1

The reactor employed in this example and Examples 2 and 3 was a section of 18 mm. I. D. glass tubing packed to a depth of approximately 24 inches with catalyst. The catalyst employed was metallic copper on an alumina support (Harshaw Cu 0801, Harshaw Chemical Company, Cleveland, Ohio). Before the reaction was run, the catalyst bed was conditioned by sweeping the system free of air with hydrogen and heating to 175° C. The catalyst bed was then heated to 275° C. and monoisopropanolamine was fed through the catalyst zone for a period of 3.2 hours at a rate of 0.42 gram of monoisopropanolamine per hour per gram of catalyst. The yield and conversion that were obtained are shown in Table I.

*Table I*

| | |
|---|---|
| Reaction temperature ° C | 275 |
| Conversion to DMPy [1] percent | 42 |
| Conversion to DMP [2] do | 8 |
| Total conversion to DMPy and DMP do | 50 |
| Total yield of DMPy and DMP do | 66 |

[1] 2,5-dimethylpyrazine.
[2] 2,5-dimethylpiperazine.

EXAMPLE 2

The process of the invention employed in Example 1 was repeated using different copper catalysts. The alkanolamine employed was monoisopropanolamine and the catalysts employed in runs Nos. 1 and 2 were commercial copper dehydrogenation catalysts. The catalyst employed in run No. 3 was turnings of reagent grade electrolytic copper. The conditions under which these runs were carried out and the conversion and yield data are set forth below in Table II.

*Table II*

| Run No. | 1 | 2 | 3 |
|---|---|---|---|
| Catalyst | Copper Chromite [a] | Barium Stabilized Copper Chromite on Silicate Support [b] | Copper Turnings [c] |
| Reaction Temperature, ° C | 275 | 260 | 275 |
| Monoisopropanolamine Feed Rate, grams/hour/gram of catalyst | 0.5 | 0.5 | 1.5 |
| Conversion to DMPy [1] percent | 66 | 49 | 14 |
| Conversion to DMP [2] do | 8 | 15 | 3 |
| Total Conversion to DMPy and DMP do | 74 | 64 | 17 |
| Total Yield of DMPy and DMP do | 75 | 71 | 67 |

[1] 2,5-dimethylpyrazine.
[2] 2,5-dimethylpiperazine.
[a] Harshaw Cu 0203, Harshaw Chemical Company, Cleveland, Ohio.
[b] Harshaw Cu 1107, Harshaw Chemical Company, Cleveland, Ohio.
[c] Baker and Adamson reagent grade electrolytic copper.

The runs carried out in Examples 1 and 2 demonstrate clearly the high conversion to carbon-substituted pyrazines and carbon-substituted piperazines that are obtained in the process of this invention. The total conversions when commercial copper hydrogenation catalysts were used ranged from 64 to 74 weight percent. An extremely important feature of the process of this invention is the high proportion of carbon-substituted pyrazines obtained in the products of the process, e. g., 66% in run No. 1 where the total conversion was 74%.

EXAMPLE 3

The effect of temperature upon the yield, conversion and product distribution is illustrated by the data in Table III below which were obtained by passing monoisopropanolamine over the copper chromite catalyst of run No.

1, Example 2, at the rate of 0.5 gram of monoisopropanolamine per hour per gram of catalyst at temperatures of 200, 225, 250 and 275° C.

Table III

| Temperature, ° C | 200 | 225 | 250 | 275 |
|---|---|---|---|---|
| Conversion to DMPy [1] | 30.6 | 36.6 | 49.2 | 66.1 |
| Conversion to DMP [2] | 23.9 | 19.3 | 16.1 | 7.8 |
| Total Conversion to DMPy and DMP | 54.5 | 55.9 | 65.3 | 73.9 |
| Total Yield of DMPy and DMP | 64.8 | 65.8 | 69.3 | 75.2 |

[1] 2,5-dimethylpyrazine.
[2] 2,5-dimethylpiperazine.

The above data clearly illustrates that, with a copper chromite catalyst, the yield and conversion to the two desired products are improved by increasing the temperature from 200° C. to 275° C. It will also be noted that increasing the temperature increases the conversion to 2,5-dimethylpyrazine and reduces the conversion to 2,5-dimethylpiperazine.

EXAMPLE 4

A run was carried out to prepare diethylpyrazine and diethylpiperazine in the process of the invention. The alkanolamine employed was the reaction product of butylene oxide and ammonia. The butylene oxide employed was butylene oxide S supplied by The Dow Chemical Company which is a mixture of butylene oxides containing about 90% of 1-butene oxide and 5% each of cis and trans 2-butene oxide. Thus, the alkanolamine employed was a mixture containing predominantly 1-amino-2-hydroxybutane and a small amount of 2-amino-3-hydroxybutane. The reaction of 1-amino-2-hydroxybutane in the process of the invention provides a mixture of 2,5-diethylpyrazine and a small amount of 2,5-diethylpiperazine. The reaction of 2-amino-3-hydroxybutane in the process of the invention produces a product mixture containing 2,3,5,6-tetramethylpyrazine and a small amount of 2,3,5,6-tetramethylpiperazine. Also, intermolecular cyclodehydration between the two types of butanolamines results in the formation of a small amount of 2,3-dimethyl-5-ethylpyrazine and 2,3-dimethyl-5-ethylpiperazine. Due to the large predominance of 1-butene oxide in the oxide mixture employed in preparing the butanolamine reactant, the product of this run was largely 2,5-diethylpyrazine.

The run was carried out by trickling the butanolamine reactant downwardly through a reactor tube containing copper chromite catalyst (Harshaw Chemical Company Cu 0203). The reactor was a 1-inch I. D. stainless steel tube encased in an electrically heated core furnace. The catalyst occupied a space of 24 inches within the steel tube, weighed 671 grams and was preceded by 19¼ inches of inert packing, which served to preheat and vaporize the butanolamine reactant.

The catalyst was prepared for the run by heating it up to 250° C. and flowing hydrogen over the heated catalyst. The feed of the butanolamine reactant was started at a rate of about 260–270 grams per hour. The reaction temperature employed was about 200° C. A total of 1506 grams (16.9 mols) of the butanolamine was passed over the catalyst during a six-hour period. The weight of liquid effluent from the reactor was 1404 grams. The 1404 grams of crude product was azeotropically distilled with water, the distillate salted out with caustic soda and the oil layer redistilled.

The distillation of the product showed that a 63.2% conversion to carbon-substituted pyrazines was obtained and that the pyrazine product was largely 2,5-diethylpyrazine. There was a 1.1% conversion to carbon-substituted piperazines and the main piperazine product was 2,5-diethylpiperazine.

It will be noted that high conversions to carbon-substituted pyrazines and carbon-substituted piperazines are obtained in the process of this invention. The remarkably improved conversions obtained in the vapor phase process of this invention employing a copper hydrogenation/dehydrogenation catalyst are sufficient to render this process adaptable to commercial applications. Broadly speaking, my process is a method of preparing carbon-substituted pyrazines and carbon-substituted piperazines by heating an alkanolamine in the presence of a copper hydrogenation/dehydrogenation catalyst in the vapor phase at a temperature in the range of 175–400° C.

I claim:

1. A method for preparing carbon-substituted pyrazines, carbon-substituted piperazines and mixtures thereof, which comprises, heating an alkanolamine in the presence of a copper hydrogenation/dehydrogenation catalyst in the vapor phase at a temperature in the range from 175–400° C., said alkanolamine corresponding to the formula

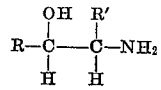

wherein R is a member selected from the group consisting of methyl and ethyl radicals, R' is a member selected from the group consisting of hydrogen and a methyl radical, the total number of carbon atoms in R and R' collectively being not greater than 2.

2. A method according to claim 1 wherein said alkanolamine is monoisopropanolamine.

3. A method according to claim 1 wherein said alkanolamine is 1-amino-2-hydroxybutane.

4. A method according to claim 1 wherein said alkanolamine is 2-amino-3-hydroxybutane.

5. A method according to claim 1 wherein said copper catalyst is copper chromite.

6. A method for preparing 2,5-dimethylpyrazine, 2,5-dimethylpiperazine and mixtures thereof, which comprises, heating monoisopropanolamine in the presence of a copper chromite hydrogenation/dehydrogenation catalyst in the vapor phase to a temperature in the range from 225–350° C.

7. A method according to claim 5 wherein said temperature is in the range of 250–325° C.

8. A method for preparing 2,5-diethylpyrazine, 2,5-diethylpiperazine and mixtures thereof, which comprises, heating 1-amino-2-hydroxybutane in the presence of a copper chromite hydrogenation/dehydrogenation catalyst in the vapor phase to a temperature in the range from 225–350° C.

9. A method according to claim 7 wherein said temperature is in the range from 250–325° C.

No references cited.